May 19, 1953      A. VAN DUYN      2,638,813

OPTICAL VIEWING AND PROJECTING COMPUTING WEIGHING SCALE

Filed Sept. 21, 1950      2 Sheets-Sheet 1

*INVENTOR:*
ADRIANUS van DUYN
*BY*
Spencer, Johnston, Cook & Root
ATT'YS

May 19, 1953     A. VAN DUYN     2,638,813
OPTICAL VIEWING AND PROJECTING COMPUTING WEIGHING SCALE
Filed Sept. 21, 1950     2 Sheets-Sheet 2

*INVENTOR:*
ADRIANUS van DUYN
BY
*Spencer, Johnston, Cook & Root*
ATT'YS

Patented May 19, 1953

2,638,813

UNITED STATES PATENT OFFICE 2,638,813

OPTICAL VIEWING AND PROJECTING COMPUTING WEIGHING SCALE

Adrianus van Duyn, Hillegersberg, Rotterdam, Netherlands, assignor to U. S. Slicing Machine Company, Inc., La Porte, Ind., a corporation of Indiana Application September 21, 1950, Serial No. 185,973
In Great Britain March 20, 1950

6 Claims. (Cl. 88—24)

1

This invention relates to computing weighing scales of the type having adjustable basic-price indicating means and having chart means and indicating means movable relatively to each other on application of the load to indicate the weight and computed value of the load.

Objects of the invention are to facilitate the reading of indications on the scale and enable the provision of an increased number of basic-price indications and corresponding computed values.

Other objects and advantages of the invention will be apparent by reference to the following description in conjunction with the accompanying drawings, in which.

Figure 1:
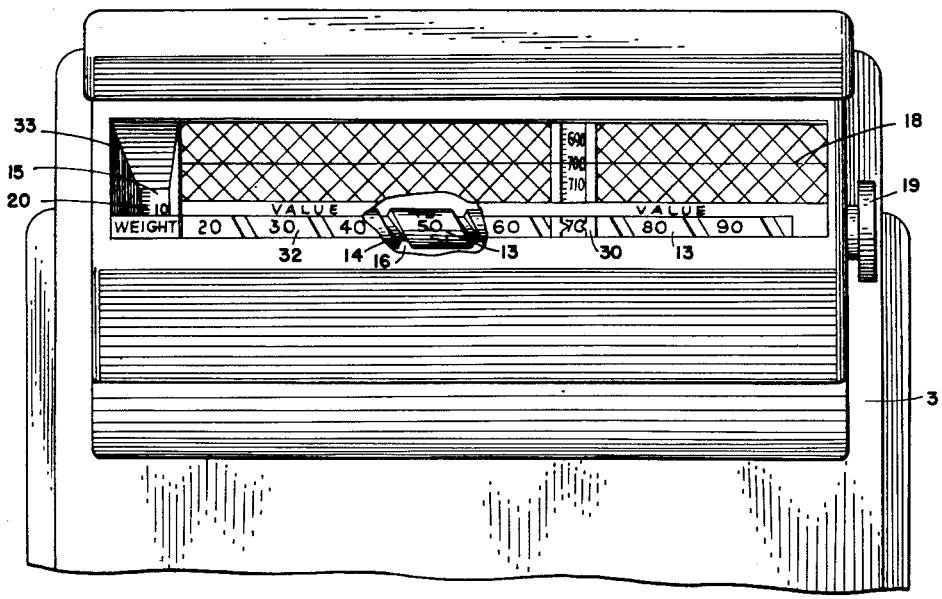
Figure 1 is a front elevational view, with parts broken away, of the upper part of a computing scale illustrative of one embodiment of the invention.
Figure 2:
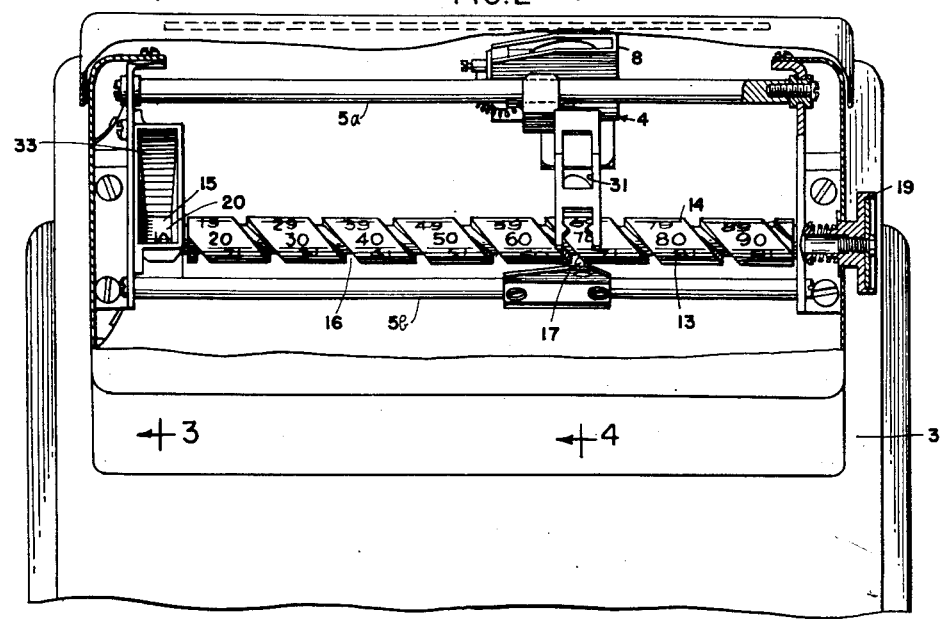
Figure 2 is a view similar to Figure 1 but with the viewing screen and transparent housing portions removed.
Figure 3:
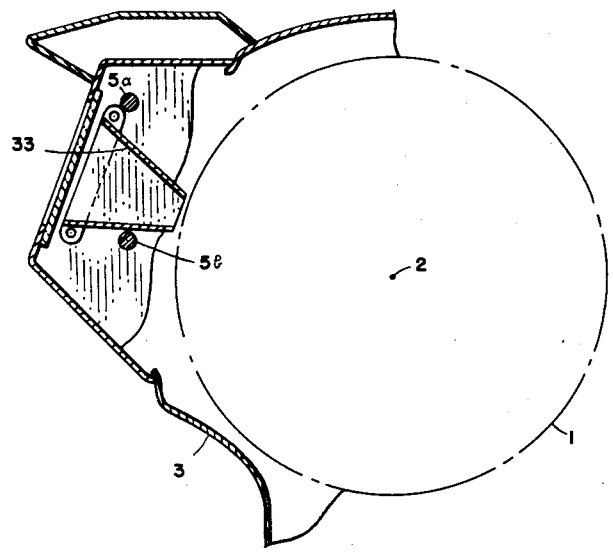
Figure 3 is a section taken along the lines 3—3 of Figure 2.
Figure 4:
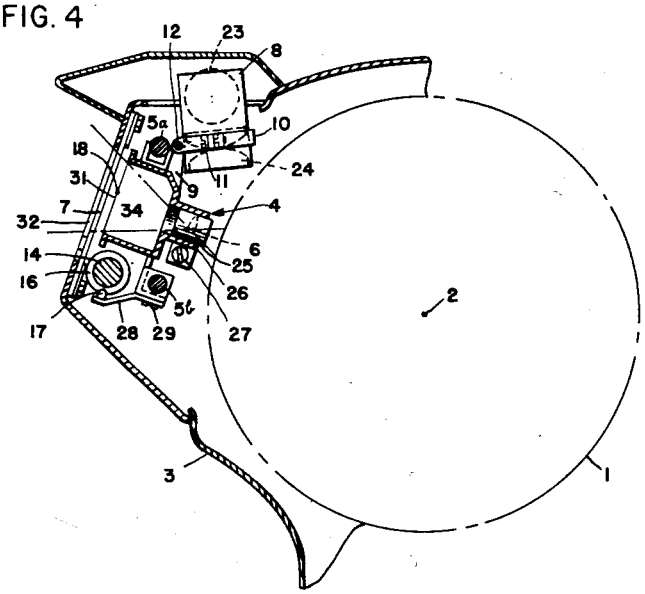
Figure 4 is a section taken along the lines 4—4 of Figure 2.

According to the invention a computing weighing scale of the aforesaid type is provided comprising a computed-value chart on which the characters are arranged in a plurality of series each corresponding to a basic price, an optical projector adapted to illuminate the computed-value indication and project a magnified image thereof, said projector being adjustable over the chart from series to series, a screen adapted to receive said image, and manually operable adjustment means adapted to effect simultaneous correlative adjustment of the basic-price indicating means and said projector.

Further according to the invention a computing weighing scale of the aforesaid type is provided comprising a rotary cylindrical computed-value chart on which the characters are arranged in a plurality of series each corresponding to a basic price, a manually rotatable cylindrical basic-price chart with the characters arranged helically thereon and with its axis parallel to the axis of the computed-value chart, a carriage adjustable axially of the charts, an optical projector on the carriage adapted to illuminate the computed-value indication and project a magnified image thereof, a screen adapted to receive said image, an indicator on the carriage adapted to indicate the basic price, and an operative connection between the basic-price

2 chart and the carriage whereby manual rotation of the basic-price chart effects axial adjustment of the carriage to a position in which a selected basic price is indicated and the projector is adjacent to the series of computed values corresponding to the indicated basic price.

In carrying the invention into effect according to one embodiment by way of example a computing chart 1 of the drum type is, on application of the load, being rotated about an axis 2.

The drum type scale is chosen only by way of example as the invention relates equally to other types of scales having charts of other shapes, for instance, flat shape.

The housing 3 of the scale is connected to the frame of the scale (not shown). A carriage 4 is slidably mounted on rails 5a and 5b rigidly connected to the frame of the scale and extending parallel to the axis 2.

In the carriage 4 is mounted a lens 6 which projects a real image 34 of the chart 1 on a screen 7 made of ground glass or similar material.

The image is limited by a window-shaped part 31 of the carriage 4. The lens 6 is mounted in a tube 25, which can be adjusted in a slotted tubular projection 26 of the carriage 4 which can be tightened around the lens tube 25 by tightening the bolt 27.

The screen 7 extends between both ends of the chart and is rigidly connected to the frame of the scale. Said screen 7 is provided with an index 18, extending over the whole length of the screen 7, such that, as will appear later, the whole chart may be read in conjunction with the index 18.

A lighting device is provided for said device in a tube 8 which is mounted in a slotted ring 10 that can be clamped around the tube 8 by means of a screw 11. By loosening the screw 11 the tube can be adjusted upwards or downwards. The inclination of the ring 10, and therewith the inclination of the tube 8 can be adjusted by loosening the bolt and nut 12, by which the ring is fastened to a projection 9 of the carriage 4.

In the tube 8 are mounted a light bulb 23 and an optical condenser 24 such that a bundle of light rays is thrown on that part of the scale which is projected by the lens 6.

The basic prices 13 are provided on a cylinder 14, said prices being arranged in the form of a helix as is visible on the broken away section of Fig. 1. By simultaneous movement of the cylinder 14 along its axis and movement of the carriage 4 along the chart one basic price at a time is perceptible through a transparent section 32 of the housing to the operator of the scale in the window 30, forming part of the carriage 4.

In the example shown the movement of the cylinder 14 and the carriage 4 is connected by means of a helical recess 16 in the cylinder 14 cooperating with a pin 17, mounted on the lip 28 connected to the carriage 4 by means of the screw 29. Rotation of the cylinder 14 involves longitudinal movement of the carriage 4 such that the basic price perceptible in the window 15 and the series of computed values as shown on the screen 7 are co-related. The cylinder may be operated by a knob 19, connected to the cylinder and extending through the housing of the scale or otherwise by a mechanism which is operated by pushing keys of a keyboard (not shown).

The weight applied to the platform of the scale (not shown) is shown by printings 20 on the chart as visible through a window 33, recessed in the housing of the scale 3 and indicated by an index 15.

In the weighing scale described a cylindrical drum chart rotates about a horizontal axis on application of the load and a centrally located peripheral series of weight characters around the drum cooperate with an index line on the scale frame at the level of the drum axis, the weight indication being viewable through a passage in the scale casing on application of the load to the scale platter and said passage having walls convergent towards the chart and being closed at its outer end by a window. The drum chart has thereon a number of peripheral series of computed-value characters at each side of the central weight characters. A cylindrical basic-price chart is mounted at the top of the scale with its axis parallel to the drum axis, and is manually rotatable by means of a handle at the end of the scale, the basic-price characters being arranged thereon in two spaced helices and each basic price having a corresponding series of computed values on the drum. The scale casing has thereon at the front a longitudinal box-like housing enclosing the basic-price chart and formed with a lower longitudinal transparent window and an upper longitudinal translucent screen of ground glass or similar material, the window and screen extending throughout the length of the charts. An optical projector within the housing is mounted on a wheeled carriage which engages upper and lower parallel guide rails on the scale frame, and is adjustable along the rails axially of the drum, from series to series of the computed-value characters. The projector is a combination of a light source and an optical projection system. The light source consists of a lamp enclosed in a tubular casing provided at its end with a condenser lens which throws a bundle of light rays on to part of a computed-value series on the chart, while the projection system consists of a magnifying lens fixed in a rectangular section tube which extends radially outwards from the illuminated computed-value characters and has its walls diverging towards the screen. An index line extends behind the screen throughout the length thereof and cooperates with the magnified real image thrown by the projector onto the screen. An indicator for the basic-price chart is in the form of a window section of the carriage and located immediately under the projector, said window being arranged to show the selected basic price. A continuous helical groove in the basic-price chart corresponds with the helices defined by the basic-price characters and extends alongside said characters. The groove is engaged by a pin on the carriage so that by manual rotation of the basic-price chart the carriage is adjusted in an axial direction relatively to the charts. By appropraite adjustment of the carriage, the window is moved to a position in which the selected basic price is shown to the operator, and simultaneously the projector is moved to a position adjacent to the computed-value series corresponding to the selected basic price. Thereafter, on application of the load to the scale, the weight of the load is indicated and an image of the computed value of the load is clearly defined on the screen.

It will be understood that the invention is equally applicable to scales with charts of other than drum shape, for example, charts of flat shape.

It will also be understood that further modifications may be made without departing from the scope of the invention. For example, the scales may be transparent, or alternative magnifying means may be provided.

The invention is hereby claimed as follows:

1. A computing weighing scale comprising a computed value chart on which the characters are arranged in a plurality of series each corresponding to a basic price, movable basic price indicating means on which the basic price characters are arranged about an axis substantially parallel to the axis of the computed value chart, means for moving said basic price indicating means to display individual basic price characters, viewing means for said computed values adjustable over said computed value chart from series to series, and adjustment means operable in response to movement of said basic price indicating means to effect simultaneous correlative adjustment of said viewing means with respect to said computed value chart, said viewing means comprising an optical projector including a light source arranged externally of said computed value chart and adapted to illuminate said chart, and means adapted to project a magnified image reflected from said chart.

2. A computing weighing scale comprising a rotary cylindrical computed value chart on which the characters are arranged in a plurality of series each corresponding to a basic price, adjustable viewing means for said computed value chart, a rotatable substantially cylindrical basic price chart with the basic price characters arranged helically thereon and with its axis substantially parallel to the axis of the computed value chart, means for rotating said basic price chart, and adjustment means operable in response to the rotation of said basic price chart to effect simultaneous correlative adjustment of the viewing means with respect to said computed value chart.

3. A computing weighing scale comprising a computed value chart on which the characters are arranged in a plurality of series each corresponding to a basic price, a movable basic price indicating means on which the basic price characters are arranged about an axis substantially parallel to the axis of the computed value chart, means for moving said basic price indicating means to display individual basic price characters, an optical projector including a light source external of said chart, means to focus light from said source on the computed value chart and a lens adjacent said light source adapted to project a magnified image of the computed values on said chart, said projector being adjustable over the chart from series to series, and adjustment means operable in response to said movement of said basic price indicating means to effect simultaneous correlative adjustment of said projector with respect to said computed value chart.

4. A computing weighing scale comprising a rotary cylindrical computed value chart on which the characters are arranged in a plurality of series each corresponding to a basic price, viewing means for said computed value chart adjustable from series to series of said computed value chart along a path substantially parallel to the axis of said chart, a rotatable substantially cylindrical basic price chart with the characters arranged helically thereon and with its axis substantially parallel to the axis of the computed value chart, said basic price chart being provided with a helical groove, means for rotating said basic price chart, and adjustment means operable in response to the rotation of said basic price chart to effect simultaneous correlative adjustment of said viewing means with respect to said computed value chart, said adjustment means comprising a carriage for said viewing means and a lug on said carriage cooperating with said groove.

5. A computing weighing scale comprising a rotary cylindrical computed-value chart on which the characters are arranged in a plurality of series each corresponding to a basic price, a manually rotatable substantially cylindrical basic-price chart with the characters arranged helically thereon and with its axis parallel to the axis of the computed-value chart, a carriage movable axially of the charts, an optical projector on the carriage including a light source adapted to illuminate the computed-value indication and a lens adapted to project a magnified image thereof, a screen adapted to receive said projected image, and an operative connection between the basic-price chart and the carriage whereby manual rotation of the basic-price chart effects axial adjustment of the carriage to a position in which a selected basic price is indicated and the projector is adjacent to the series of computed values corresponding to the indicated basic price.

6. A computing weighing scale comprising a computed value chart on which the characters are arranged in a plurality of series, each corresponding to a basic price, a movable basic price indicating means on which the basic price characters are arranged about an axis substantially parallel to the axis of the computed value chart, said computed value chart and said basic price indicating means extending substantially the same distance on their respective axes, means for moving said basic price indicating means to display individual basic price characters, an optical projector mounted adjacent said movable basic price indicating means and movable parallel to the axes of said basic price indicating means and said computed value chart, a fixed translucent screen external of and parallel to the axis of said computed value chart, and adjustment means operable in response to the movement of said basic price indicating means to effect simultaneous correlative adjustment of said projector with respect to said computed value chart, said projector being adjustable over the computed value chart from series to series and comprising a light source arranged externally of said computed value chart, means to focus the light from said light source onto said chart, and a lens adjacent said light source adapted to project and focus a magnified image of the computed values from said chart onto said screen.

ADRIANUS van DUYN.

References Cited in the file of this patent

UNITED STATES PATENTS

| Number | Name | Date |
| --- | --- | --- |
| 893,099 | Reinhardt | July 14, 1908 |
| 1,487,514 | Goss | Mar. 18, 1924 |
| 1,619,121 | Hem | Mar. 1, 1927 |
| 1,690,258 | Strachan | Nov. 6, 1928 |
| 1,715,074 | Platten | May 28, 1929 |
| 1,880,415 | Carroll | Oct. 4, 1932 |
| 1,882,774 | Carroll | Oct. 18, 1932 |
| 2,265,992 | Beck | Dec. 16, 1941 |
| 2,290,287 | Links et al. | July 21, 1942 |
| 2,541,365 | Kauffman | Feb. 13, 1951 |